United States Patent [19]

Bruso

[11] Patent Number: 5,631,160
[45] Date of Patent: May 20, 1997

[54] METHOD FOR IN SITU SOIL REMEDIATION

[76] Inventor: Bruce L. Bruso, R.R. 1, Box 1T, Hegins, Pa. 17938

[21] Appl. No.: 287,275

[22] Filed: Aug. 8, 1994

Related U.S. Application Data

[63] Continuation-in-part of Ser. No. 57,342, May 3, 1993, abandoned.

[51] Int. Cl.$^6$ .............................. A62D 3/00; B09C 1/06; B09C 1/10
[52] U.S. Cl. ................ 435/262.5; 405/128; 405/131; 405/258; 405/263; 405/264; 405/266; 405/303; 435/262
[58] Field of Search .......................... 405/128, 131, 405/258, 263, 264, 266, 269, 303; 435/262, 262.5, 289, 313

[56] References Cited

U.S. PATENT DOCUMENTS

| | | | |
|---|---|---|---|
| 4,447,541 | 5/1984 | Peterson | 435/264 |
| 4,543,013 | 9/1985 | Wagner et al. | 405/128 |
| 4,548,720 | 10/1985 | Gilligan | 252/8.5 B |
| 4,687,373 | 8/1987 | Falk et al. | 405/128 |
| 4,737,356 | 4/1988 | O'Hara et al. | 423/659 |
| 4,844,807 | 7/1989 | Manchak et al. | 210/682 |
| 4,849,360 | 7/1989 | Norris et al. | 435/264 |
| 4,891,320 | 1/1990 | Aust et al. | 435/262 |
| 4,927,292 | 5/1990 | Justice | 405/43 |
| 4,950,409 | 8/1990 | Stanforth | 210/751 |
| 5,037,240 | 8/1991 | Sherman | 405/128 |
| 5,057,227 | 10/1991 | Cohen | 210/680 |
| 5,085,998 | 2/1992 | Lebron et al. | 435/262 |
| 5,118,230 | 6/1992 | Justice | 405/128 |
| 5,133,625 | 7/1992 | Albergo et al. | 405/263 |
| 5,161,914 | 11/1992 | Rahn et al. | 405/128 |
| 5,162,600 | 11/1992 | Cody et al. | 588/236 |
| 5,169,263 | 12/1992 | Johnson et al. | 405/128 |
| 5,242,246 | 9/1993 | Manchak, III et al. | 405/128 |
| 5,348,422 | 9/1994 | Manchak et al. | 405/128 |

OTHER PUBLICATIONS

Toyota Industrial Equipment brochure entitled "Toyota Trenchers", 2 pp., Sep. 1989.
Drawing, Environmental Contructors, Inc., 1 p., Jun. 1992.
Farrell, "Breaking new ground in groundwater remediation", Hazmat World, Jan., 1993, pp. 28–30.
Hazmut World, "Cutoff Walls", Feb., 1993, pp. 42–44.

*Primary Examiner*—Helen Pratt
*Attorney, Agent, or Firm*—Seidel, Gonda, Lavorgna & Monaco

[57] ABSTRACT

Contaminated material such as soil or sludge is remediated by injecting a suitable remediation fluid into the material during excavation of the contaminated material with a trenching tool. The remediation fluid is injected into the contaminated material through an injection means, preferably a plurality of injection nozzles positioned along the length of the trenching tool. The thusly treated material is backfilled or deposited directly into the trench excavated by trenching tool thereby obviating the need for off-site disposal. The constituent remediation agents in the remediation fluid may be adjusted to adapt to varying site conditions and contaminants. The remediation fluid may also be heated to accomplish volatile stripping of the contaminated material or to activate microbial agents in a low temperature environment.

19 Claims, 7 Drawing Sheets

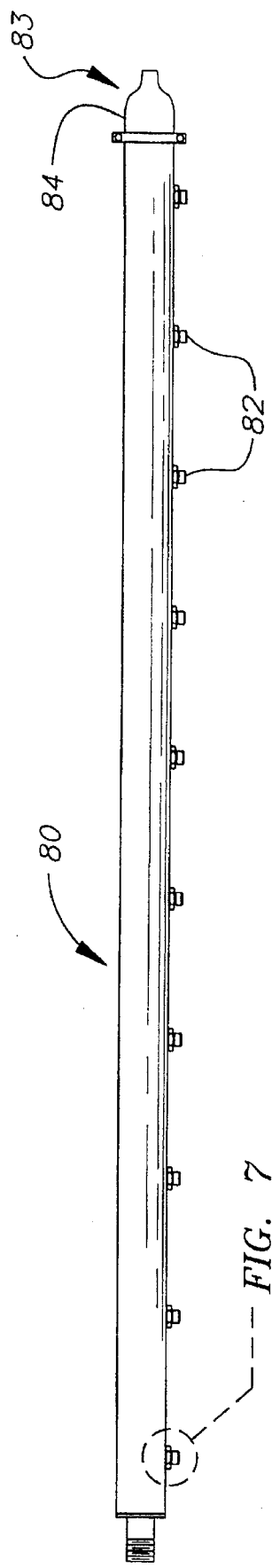
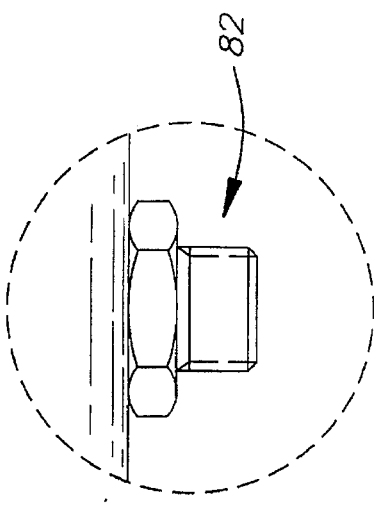
FIG. 6
FIG. 7

METHOD FOR IN SITU SOIL REMEDIATION

This is a continuation-in-part of application Ser. No. 08/057,342 filed on May 3, 1993, now abandoned which is incorporated herein by reference.

FIELD OF THE INVENTION

The invention relates to a method and an apparatus for the in situ remediation of contaminated soil or sludge.

BACKGROUND OF THE INVENTION

It is widely recognized that years of unregulated industry have produced numerous environmentally hazardous sites throughout the country and the world which pose substantial health hazards to world's population. In recent years, efforts to clean up or remediate environmentally contaminated sites have increased dramatically, and numerous methods and devices for cleaning up or disposing of environmental contamination have been devised or proposed. However, the magnitude of the environmental problems is enormous, but the resources available to solve the problems are limited. Therefore, there is an urgent need for methods of remediation that are relatively uncomplicated, may be rapidly implemented, and are technically and cost effective.

Therefore, it is an object of this invention to provide a cost effective, relatively rapid method of remediating environmentally contaminated sites.

It is another object of this invention to provide a highly mobile apparatus for remediating environmental contaminants.

It is yet another object of this invention to provide a method of remediating contaminated soil in situ and without removal or disposal of the treated or contaminated material.

It is yet another object of the invention to provide a method that is capable of remediating contaminated soils and sludges in a continuous, in contrast to a batchwise, manner.

It is yet another object of the invention to provide a remediation apparatus and method which may be used on highly unstable soils and in tight quarters such as in the basements of buildings or near above-ground or below-ground storage tanks.

The above objects and advantages of the present invention will become more apparent when reference is made to the following description taken in conjunction with the accompanying drawings.

SUMMARY OF THE INVENTION

Contaminated material such as soil or sludge is remediated by injecting a suitable remediation fluid into the material during excavation of the contaminated material with a trenching tool. The remediation fluid is injected into the contaminated material through an injection means, preferably a plurality of injection nozzles positioned along the length of the trenching tool. The thusly treated material is backfilled or deposited directly into the trench excavated by the trenching tool thereby obviating the need for off-site disposal. The constituent remediation agents in the remediation fluid may be adjusted to adapt to varying site conditions and contaminants. The remediation fluid may also be heated to accomplish volatile stripping of the contaminated material or to activate microbial agents in a low temperature environment.

In one aspect, the present invention is an injection treatment apparatus for remediating contaminated material at a contaminated site having a trenching mechanism means with a trenching tool and a means for positioning and powering the trenching tool. The apparatus has an injection means for injecting a remediation fluid into the contaminated material in close proximity to the trenching tool and a remediation fluid delivery means for conveying and delivering the remediation fluid to the injection means under pressure.

The injection means has at least one injection nozzle, preferably a plurality of injection nozzles, positioned to inject the remediation fluid into contaminated material excavated during operation of the trenching tool. The injection nozzles are preferably located at predetermined positions along the length of the trenching tool.

The remediation fluid delivery means has a remediation fluid storage means, a conduit means and a pump means for pumping the remediation fluid from the storage means through the conduit means to the injection means under pressure. Optionally, the remediation delivery means may have a heating means for heating the remediation fluid such as in the case of forced hot air.

The apparatus may also have a monitoring means for monitoring a selected physical or chemical property of the contaminated material such as pH, oxygen content, temperature or the like in the proximity of the trenching tool during operation of the apparatus and a means for adjusting the selected property of the contaminated material to a predetermined value, such as a means for adjusting the amount of a constituent remediation agent in the remediation fluid injected into the contaminated material during operation.

The apparatus may also comprise a volatile collection means for collecting volatile substances such as volatile hydrocarbons emitted from the contaminated material during treatment with the injection treatment apparatus.

In another aspect, the invention comprises a method for remediating a contaminated material at a contaminated site. The method comprises agitating the contaminated material with a trenching tool mechanism having a trenching tool and contemporaneously injecting a suitable remediation fluid into the agitated or excavated contaminated material in the proximate vicinity of the trenching tool to provide a treated material. The treated material is preferably deposited into the trench excavated by the trenching tool mechanism.

Where the contaminated material comprises a volatile constituent, the remediation fluid is preferably a fluid such as hot air for volatilizing a volatile constituent which is then collected using a collection means. In the case of a liquid or semi-solid contaminated material such as a sludge or wastewater lagoon, the remediation fluid preferably comprises a solidification agent which is injected into the contaminated material thereby solidifying it and permitting further treatment. The method may also comprise monitoring a selected physical or chemical property of the contaminated material such as pH, oxygen content, temperature or the like and adjusting the selected property of the contaminated material to a predetermined value such as a value determined necessary or sufficient to environmentally remediated the contaminated material. For example, the pH may be maintained at a predetermined value by adjusting the amount of a constituent pH adjusting agent such as a pH buffer solution in the remediation fluid. The method may also comprise the step of heating the remediation fluid prior to injecting it into the contaminated material. This is useful where the remediation fluid comprises a microbial bioremediation agent and a gas such as air is heated sufficiently to activate the bioremediation agent in the contaminated material in a low temperature environment.

BRIEF DESCRIPTION OF THE DRAWINGS

FIG. 6 is a side elevation of the injection or evacuation manifold.

FIG. 7 is an enlarged view of an injection or evacuation port of the manifold.

DETAILED DESCRIPTION OF THE PREFERRED EMBODIMENTS

Figure 1:
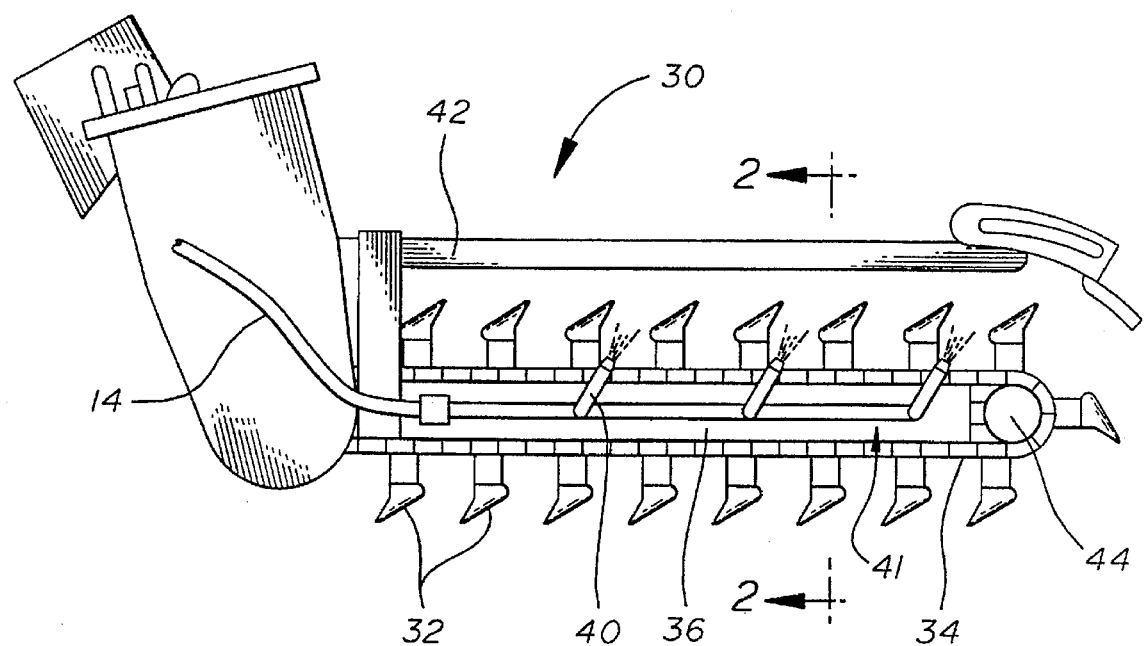
FIG. 1 is a side elevation of the trenching tool portion of the trenching tool mechanism and the injection means.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 2:
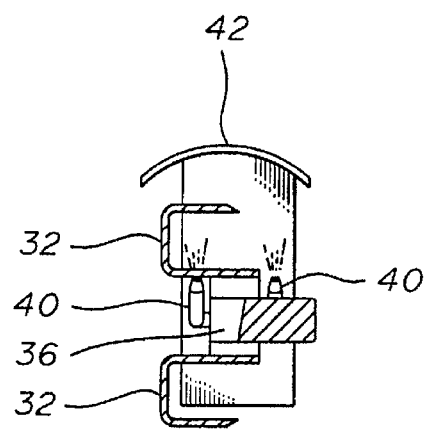
FIG. 2 is a sectional view taken through line 2—2 of FIG. 1.
Figure 3:
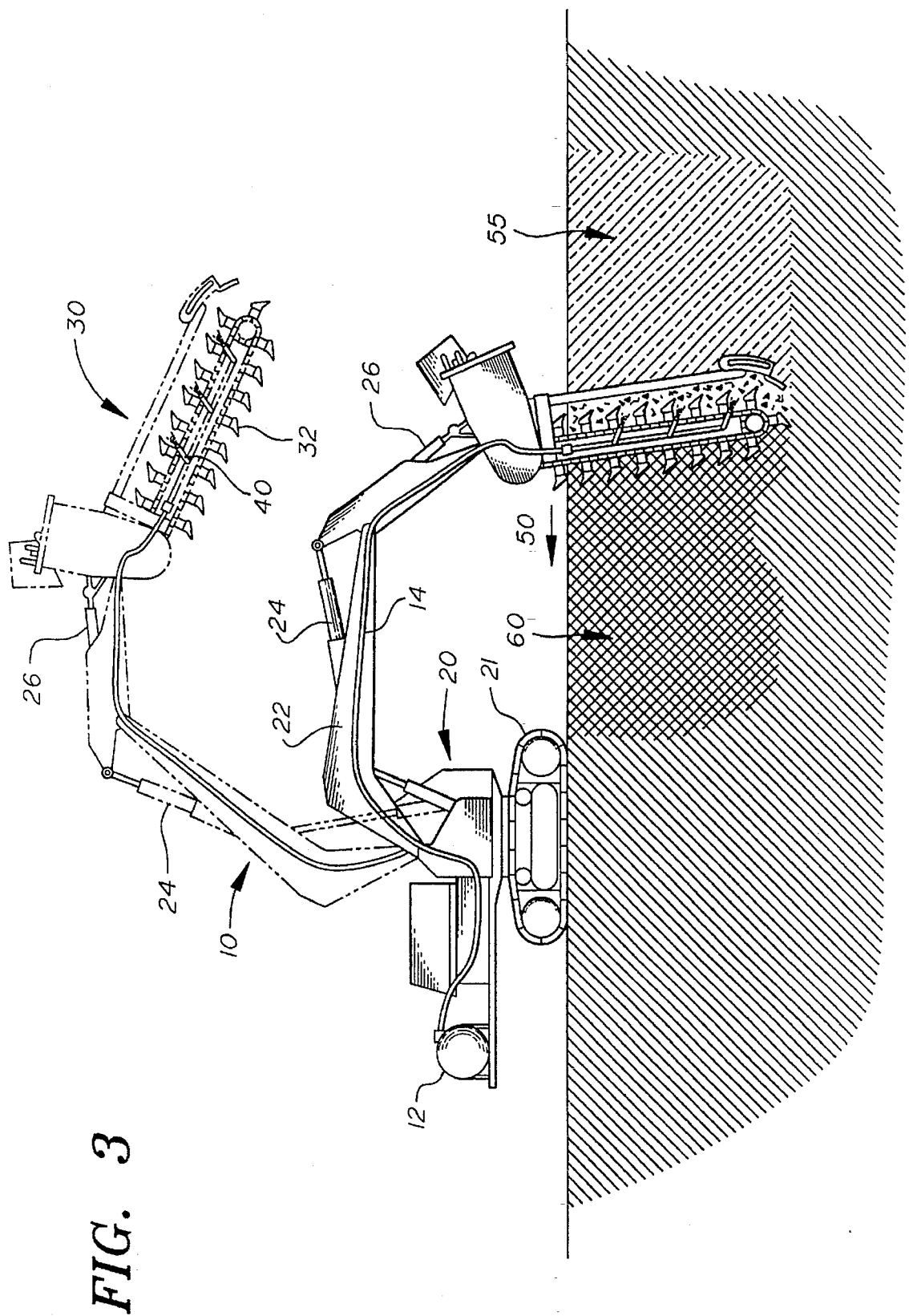
FIG. 3 is a schematic diagram of a trenching tool mechanism excavating contaminated soil and injecting a remediation fluid along the length of the trenching tool.

With reference to the drawings, in general, and FIGS. 1 through 3 in particular, a trenching tool mechanism 10, injection means 41 and remediation fluid delivery means are shown.

The trenching tool mechanism 10 includes a mobile unit 20 mounted on tracks 21 having a boom 22 and hydraulic piston cylinder assemblies 24 and 26 for positioning trenching tool 30. Injection system 41 having injection nozzles 40 is mounted along the length of shaft 36 of trenching tool 30. The injection nozzles 40 are positioned below a plurality of digging tools 32 mounted on conveyor chain 34. As can be seen from the drawings, the injection nozzles are positioned such that the remediation fluid is injected below the soil surface while the contaminated soil is being excavated or comminuted by the trenching tool. The remediation fluid is thereby injected in the trench in the immediate vicinity of the excavation or comminution of the contaminated soil along the trenching tool. In operation, conveyor chain 34 is driven about sprockets 44 at the ends of shaft 36. The trenching tool 30 is capable of excavating a trench of 3 to 30 feet in depth. The mobile unit 20 may be any suitable equipment such as a skid loader, backhoe, excavator, gradall or the like. The size of the trenching tool and mobile unit will vary depending upon site conditions.

The remediation fluid is pumped from storage tank 12 through conduit 14 to injection system 41 under pressure by a pump (not shown). The injection pressure may vary from about 10 psi to about 3,000 psi depending upon the desired remediation treatment. The remediation fluid may also be heated by a heating unit (not shown). The size and number of the injection nozzles may vary in accordance with the remediation treatment. For example, the nozzle size for pressurized hot air may range from about 1" to about 4" in diameter. Nozzle size for injecting a high pressure liquid may be ¼" or smaller. The injection system may be pressurized by any suitable power source such as a hydraulic, electric or diesel power unit.

The remediation fluid delivery system may comprise a mixing unit for mixing constituent remediation agents from a plurality of storage tanks. Alternatively, parallel systems for delivering and injecting a plurality of remediation fluids may be employed. Such an embodiment is particularly useful, for example, when two or more different remediation fluids such as a gas and a liquid are being injected into the contaminated soil simultaneously. The parallel system permits the multiple fluids to be injected through injection nozzles of different sizes at different pressures.

With reference to FIGS. 4 through 7, in a preferred embodiment, the remediation fluid may be injected adjacent to conveyor chain 34 and digging tools or teeth 32 from manifold 80 positioned lengthwise parallel to shaft 36. The remediation fluid is injected through injection ports 82. alternatively, the ports may be plugged with port plugs (not shown) and end cap 84 at end 83 of manifold 80 may be removed to allow injection solely in the bottom of the trench. Optionally, a video camera 94 may be mounted on trencher tool housing 90 or, alternatively, at end 83 of manifold 80. A monitor mounted in the cab of mobile unit 20 and attached to camera 94 permits the operator to view the injection and trenching activity within the trench.

In operation, the contaminated soil 60 is excavated, and thereby comminuted and agitated, by trenching tool 30 in the direction of arrow 50. During excavation, a suitable remediation fluid is pumped through injection nozzles 40 of injection system 41 into the contaminated soil. The treated soil 55 is discharged into the trench thusly excavated by trenching tool 30 behind trench guard 42. A wide area of contaminated material such as contaminated soil or sludge at a site may be treated by trenching in parallel rows or any other suitable pattern across the entire area.

Preferably, after an initial trench is excavated, a trench immediately adjacent to the initial trench is excavated and injected with remediation fluid. The thusly treated soil falls or is discharged to the side of the new trench line into the void of the initially excavated trench. Each subsequent trench is then excavated immediately adjacent to the preceding trench. In this manner, the soil is treated in situ without removing any significant amounts treated or contaminated soil above the ground level or surface of the contaminated material 56. Only a minimal amount of treated and untreated soil is exposed to the atmosphere, since only one trench line is exposed at any given moment.

Figure 9:
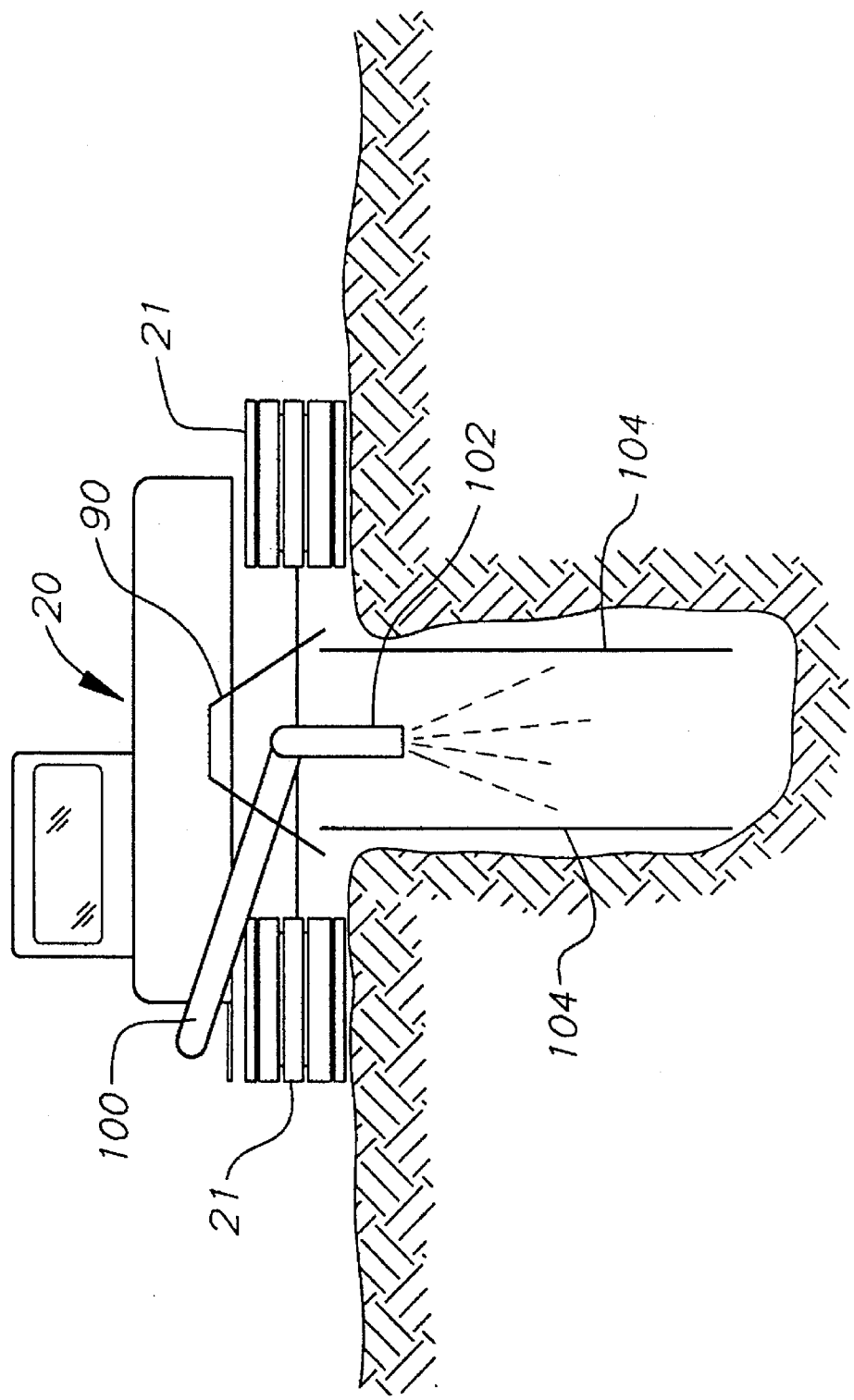
FIG. 9 is a schematic view of a large-scale soil remediation apparatus according to the present invention.

Alternatively, the treated soil may be returned into the trench which is currently being excavated. This can be achieved by excavating the soil (which has been treated by injection) with the trenching tool and conveying it by cross and return conveyors 100 as illustrated in FIG. 9 and the like to an open portion of the trench. The use of cross and return conveyors to backfill a trench is known and will be apparent to one skilled in the art. Soil treated by injection is deposited on a cross conveyor and then transferred to return conveyor 100 and discharged through chute 102 into the trench behind trenching tool 30 (not shown). Preferably, bank guard 104 is attached to trenching tool 30 to prevent the collapse of the trench walls. Backfilling may be required where a large scale trenching tool and tractor are employed as illustrated in FIG. 9, since as a practical matter the size of the trench may not permit the tractor to position the trenching tool immediately adjacent to the first trench without the tractor falling into the trench. When the treated soil is backfilled, it is preferred that the cross and return conveyors be enclosed or shrouded to minimize exposure of the soil to the atmosphere.

Any suitable remediation fluid, such as gases, liquids, slurries, or particulate solids, may be injected into the contaminated material in accordance with the process of this invention. The choice of remediation fluid and its constituents will depend upon site conditions and the contaminants sought to be remediated. By way of example, and without intending to be limited thereto, a liquid lime solution may be injected to stabilize a lead-contaminated site. A liquid biostimulant such as POLYBAC-N™, POLYBAC-E™ biostimulants and appropriate microorganism such as HYDROBAC™, PETROBAC™, microorganisms and PHENOBAC™ are sold by Polybac Corp. of Bethlehem, Pa. may be injected to treat contaminants such as mineral oil, glycol or chlorinated phenols. Other suitable bioremediation fluids and nutrient include, for example, the white rot fungi and enzymes disclosed in U.S. Pat. Nos. 4,891,320 and 5,085,998, the disclosures of which are herein incorporated by reference, and the corresponding biostimulants including lignin, cellulose, wood shavings, sawdust, corn cobs, and humus disclosed therein. The remediation fluid may also comprise various encapsulating or zeolitic compounds and compositions such as ZEOMIX™ composition available from Pacific Summa Corp through its distributor, Shefiord-Mead, of West Chester, Pa. Other suitable remediation fluids and reagents include alkali constituents and sulfoxide catalyst disclosed in U.S. Pat. No. 4,447,541, the aqueous silicate solutions and fixatives disclosed in U.S. Pat. No. 4,687,373, and calcium orthophosphate agents and other remediation constituents disclosed in U.S. Pat. No. 5,162,600, the patent disclosures of which are separately incorporated herein by reference. Sludges may be solidified by injecting a solidification agent such as kiln dust into the contaminated sludge. If desired, a variety of remediation agents may be used in combination. For example, an oxygenation agent such as grade D breathing air may be used in combination with a bioremediation agent to aerate and accelerate the treatment of the contaminated material.

Stripping of volatile contaminants such as acetone, toluene, isopropyl alcohol, trichloroethanol, and the like may be accomplished by injecting hot air under pressure to volatilize the contaminants. The volatile contaminants may be collected by any suitable collection system such as a tent-like structure having a positive pressure circulation system with a carbon filter. Such a collection system is available from Sprung Structures, Inc. of Allentown, Pa. The apparatus of the present invention may be sized to operate within the tent-like structure.

In a preferred embodiment, hot air is injected under pressure through injection manifold 80. The air is supplied by a blower such as is known in the environmental remediation arts for use in volatile stripping which heats the temperature of the air to between 200°–300° F. It is however preferred to increase the hot air temperature to well above this conventional temperature range by further heating the air with a supplemental heating element. For example, the exhaust of a diesel powered excavator may be used to raise the temperature to between 400° and 550° F. This permits the volatilization of hydrocarbon substances which would not be otherwise remediable by conventional volatile stripping. The comminution of the soil by the trenching tool also serves to reduce the density of non-porous or slightly porous soil types which would not otherwise be treatable by conventional volatile stripping methods.

Figure 4:
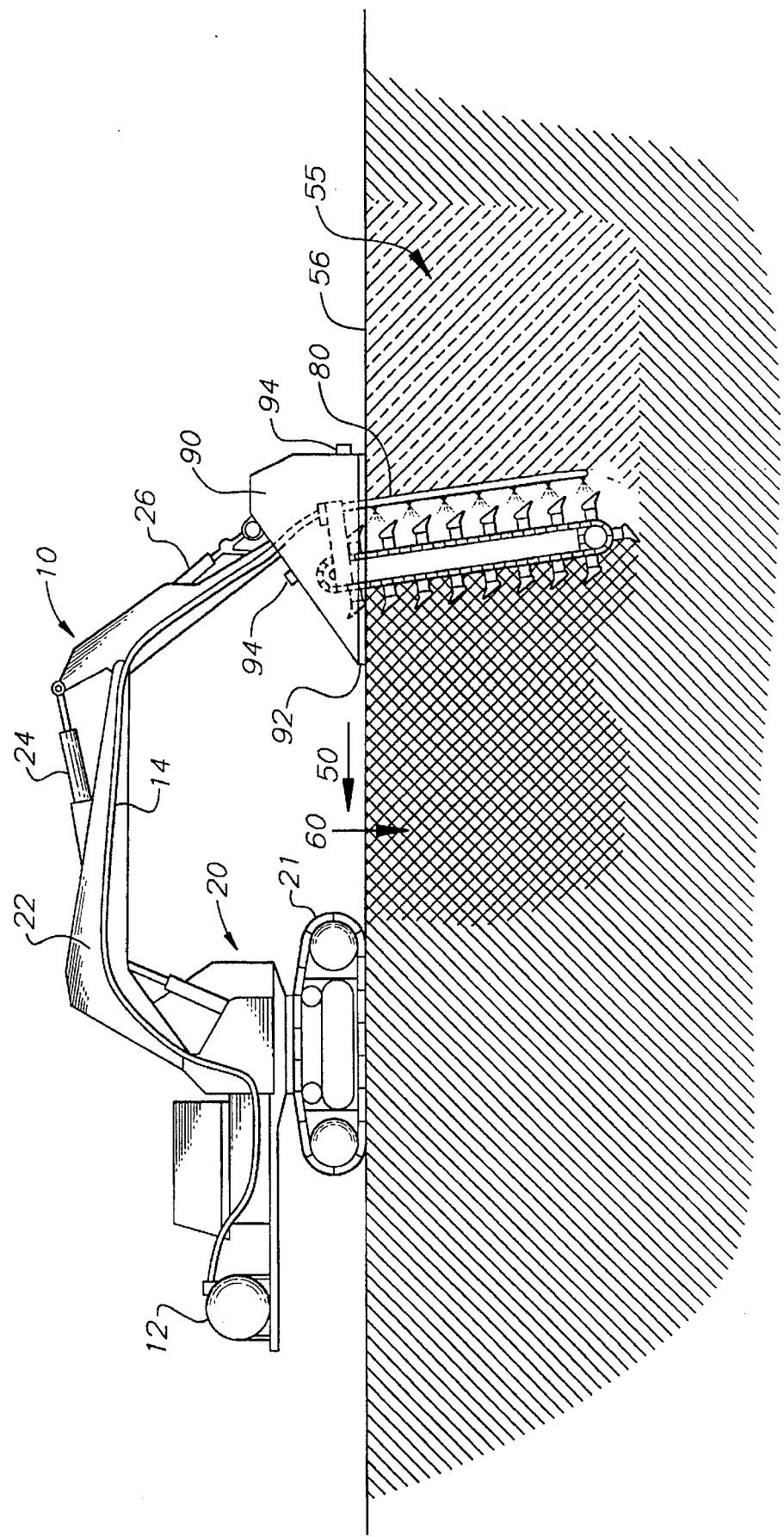
FIG. 4 is a schematic diagram of another embodiment of a trenching tool mechanism excavating contaminated soil and injecting a remediation fluid along the length of the trenching tool.
Figure 5:
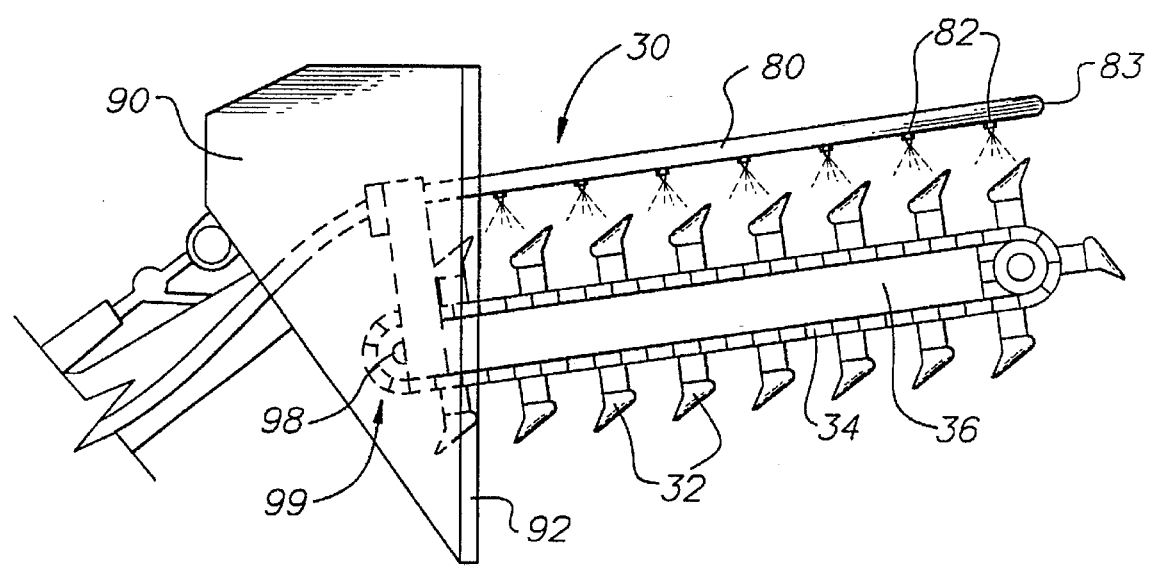
FIG. 5 is a side elevation of another embodiment of the trenching tool portion of the trenching tool mechanism and the injection means.
Figure 8:
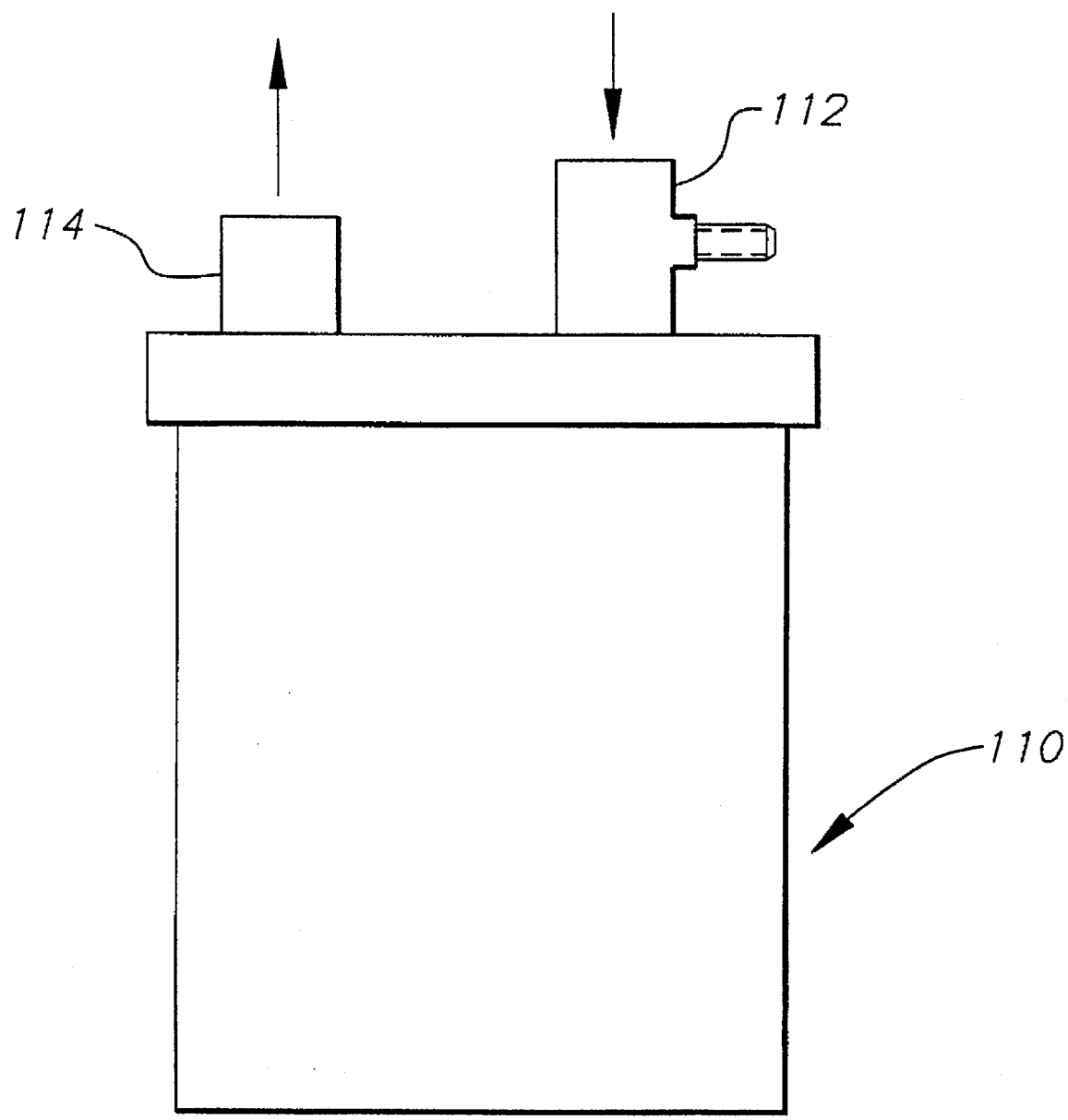
FIG. 8 is a schematic view of the carbon filter of the evacuation system of the apparatus.

When hot air is injected into the soil, the emissions are preferably recovered to prevent release into the atmosphere. The present invention provides for an emissions evacuation system to collect emitted gases. With reference to FIGS. 4 and 5, a trencher tool housing 90 may be fitted about end 99 of shaft 36. Housing 90 may comprise flexible skirt 92 to prevent the release of gases under the perimeter of the housing. A negative pressure evacuation system (not shown) may be fitted to port 96 to draw released gases to a filter such as a carbon canister filter 110 (FIG. 8). the gas enters the filter through port 112 and the filtered gas is exit through port 114. Preferably when hot air is being injected into the soil, the filtered hot air is recirculated back to the blower for subsequent injection into the trench area through the injection system.

In another embodiment, the hot air may be injected through port 96 in the proximity of chain 34 at chain gear drive 98 at end 99 of shaft 36. The evacuation system may then be connected to manifold 80 and the released gases are evacuated through ports 82. In yet another embodiment, the hot air is injected through the end of a second manifold positioned parallel to manifold 80 at the bottom of the trench while the evacuation system is collects released gases through manifold 80. The hot air is thereby injected in the bottom of the trench as the soil is being comminuted.

The present invention may be used to remediate contaminated sites which were heretofore untreatable. For example, bioremediation of contaminated soil may not, in general, be achievable in low temperature environments, typically environments having temperatures below about 40° F. The low temperatures tend to incapacitate or kill the microorganisms that accomplish the remediation. However, the present method provides for the injection of a heated gas such as hot air in combination with the bioremediation agent thereby raising the temperature at the locus of treatment and activating the bioremediation agent. This has the beneficial effect of permitting bioremediation of contaminated soils in cooler or arctic climates and/or extending the effective season during which bioremediation may be accomplished in temperate climates.

In another instance, the present invention provides for the injection of remediation fluids in dense, day-laden soils. The prior art methods of injection are ineffective in treating non-porous, day-laden soils, because the injected remediation fluid is unable to migrate throughout the soil. However, according to the present invention, day-laden soils may be effectively remediated, because the method comminutes the soil during excavation by the trenching tool.

The present invention is principally intended for the treatment of contaminated soil. However, a wide variety of contaminated materials, including semi-solid sludges and wastewater lagoons, may be treated in accordance with the invention. In the case of a lagoon, the injection treatment apparatus may act as a kind of large-scale, mobile mixer for agitating and injecting a remediation fluid into the wastewater. The wastewater may be first treated to neutralize contaminants in the water, and subsequently treated with a solidification agent. Alternatively, the wastewater may be first injected with a solidification agent to form a contaminated "soil", and then injected with a second remediation fluid to neutralize the contaminants.

EXAMPLES

The following examples are illustrative of the process of the present invention but are not intended to limit the scope of the present invention.

Example 1

A soil contaminated by machine oil leaked from heavy equipment is subject to a treatability study to determine appropriate bioremediate agents and nutrients for the bioremediation of the soil. It is determined that HYDROBAC™ bacteria and POLYBAC-N™ nutrients available from Polybac of Bethlehem, Pa., are suitable to remediate the contaminated soil. The contaminated site is laid out in grids and each grid is treated by injecting sufficient POLYBAC-N™ nutrients to the depth of the contamination up to 12 feet using the apparatus of the present invention to insure sufficient levels of nitrogen and phosphorus. During an eight week period, the HYDROBAC product with water is injected at periodic intervals using the apparatus of the invention. To provide ample oxygen, air is injected in the soil by the apparatus on a daily basis. Bacterial growth and activity are monitored on a weekly basis and adequate nutrient concentrations and pH are maintained in the soil at all times through the injection of required substituents (bacteria, nutrients or water) at all times.

Example 2

The slow leakage of VARSOL™ solvent, a solvent comprised of mineral spirits and naphtha, from a drum storage area resulted in a gradual release and infiltration of petroleum hydrocarbons into underlying soil. The contamination consisted of approximately 2500 cubic yards in ground having a Total Petroleum Hydrocarbons ("TPH") content in the range of 4444 ppm to 16268 ppm. The site area was divided into several work area grids. A chain type trenching tool was mounted on the boom of a excavator and an injection manifold was installed. Each grid was processed with by injecting forced hot air at a temperature of 350°–480° F. below the groundlevel surface while trenching to a depth of approximately twelve feet in parallel rows within each grid. An emissions evacuation system comprising a evacuation manifold positioned adjacent and parallel to trenching chain was used to evacuate noxious emissions. Air monitoring was performed on the vapor recovery system of the processing apparatus as well as background areas to determine the extent of emissions, if any. At the end of the processing, TPH levels were reduced to less than 5 ppm throughout the site. No significant air emissions were detected.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A process for remediating a contaminated material at a contaminated site comprising:
   comminuting the contaminated material with a trenching tool mechanism having a trenching tool; and
   injecting a remediation fluid into the contaminated material in the proximity of the trenching tool below the surface of the contaminated material while the material is being comminuted by the trenching tool, using a sufficient amount of remediation fluid, under conditions and for a time sufficient to remediate the contaminated material to provide a remediated material.

2. The process of claim 1, wherein the process further comprises the step of depositing the remediated material into the trench excavated by the trenching tool mechanism.

3. The process of claim 1, wherein the remediation fluid comprises a fluid for volatilizing a volatile contaminant in the contaminated material, and the process further comprises the step of collecting the volatilized volatile contaminant.

4. The process of claim 3 wherein the remediation fluid for volatilizing the volatile contaminant comprises air heated to a temperature of between about 200° F. and about 550° F.

5. The process of claim 3, wherein the remediated fluid is a gas at a temperature sufficient to volatilize the volatile component.

6. The process of claim 5, wherein the remediation fluid is air.

7. The process of claim 1, wherein the contaminated material is a liquid or semi-solid, and, prior to the comminution step, a solidification agent is injected into the contaminated material while the liquid or semi-solid contaminated material is being agitated by the trenching tool.

8. The process of claim 7, wherein the remediation fluid and solidification agent are injected into the contaminated material simultaneously.

9. The process of claim 1, wherein the process further comprises the steps of:
   monitoring a selected physical or chemical property of the contaminated material; and
   adjusting the selected property of the contaminated material to promote suitable conditions for remediation of the contaminated material.

10. The process of claim 9, wherein the selected property is the pH of the contaminated material, and the pH is maintained at a value suitable for promoting remediation of the contaminated material by adjusting the amount of a constituent pH adjusting agent in the remediation fluid.

11. The process of claim 1, wherein the process further comprises the step of heating the remediation fluid to a temperature sufficient to volatilize a volatile contaminant in the contaminated material prior to injecting it into the contaminated material.

12. The process of claim 1, wherein the remediation fluid comprises a bioremediation agent.

13. The process of claim 12, wherein remediation fluid comprises a gas heated to a temperature sufficient to to enable the biological decontamination of contaminants in the contaminated material.

14. The process of claim 12, wherein the remediation fluid comprises a constituent selected from the group consisting of contaminant-degrading bacterial microorganisms, bionutrients, water, air, oxygen and mixtures thereof and is suitable for stimulating the growth of contaminant-degrading microbes.

15. The process of claim 12, wherein the remediation fluid comprises white rot fungus.

16. The process of claim 15, wherein the remediation fluid comprises a biostimulant suitable for stimulating the growth of contaminant-degrading white rot fungus selected from the group consisting of lignin, cellulose, wood shavings, sawdust, corn cobs, humus and mixtures thereof.

17. The process of claim 1, wherein the remediation agent comprises a composition for encapsulating a contaminant in the contaminated material.

18. The process of claim 1, wherein the remediation fluid comprises a zeolitic compound and the remediation fluid serves to encapsulate a contaminant in the contaminated material.

19. A process for remediating a contaminated material comprising a volatile contaminant at a contaminated site comprising:
   comminuting the contaminated material with a trenching tool mechanism having a trenching tool; and
   injecting a gas at a temperature sufficient to volatilize the volatile contaminant into the contaminated material in the proximity of the trenching tool below the surface of the contaminated material while the material is being comminuted by the trenching tool under conditions and for a time sufficient to remediate the contaminated material to provide a remediated material.

* * * * *